(12) United States Patent
Parrish, Jr.

(10) Patent No.: US 7,682,121 B2
(45) Date of Patent: Mar. 23, 2010

(54) HAY BALE ACCUMULATOR

(76) Inventor: Spurgeon L. Parrish, Jr., 5816 Highway 277, Crossville, AL (US) 35962

( * ) Notice: Subject to any disclaimer, the term of this patent is extended or adjusted under 35 U.S.C. 154(b) by 194 days.

(21) Appl. No.: 11/717,314

(22) Filed: Mar. 13, 2007

(65) Prior Publication Data

US 2007/0217893 A1 Sep. 20, 2007

Related U.S. Application Data

(60) Provisional application No. 60/783,893, filed on Mar. 20, 2006.

(51) Int. Cl.
*A01D 90/08* (2006.01)

(52) U.S. Cl. .................. 414/111; 56/475; 198/410; 198/442

(58) Field of Classification Search ............... 198/410, 198/436, 442, 451; 414/111, 24.5, 24.6, 414/25, 546, 789.7; 56/473.5, 474–477
See application file for complete search history.

(56) References Cited

U.S. PATENT DOCUMENTS

| | | | | |
|---|---|---|---|---|
| 2,805,753 A | * | 9/1957 | Palmer | 198/374 |
| 3,487,955 A | * | 1/1970 | Brown | 414/789.2 |
| 3,596,777 A | * | 8/1971 | Neely, Jr. | 414/789.4 |
| 3,779,402 A | | 12/1973 | Erlenbusch et al. | |
| 3,924,757 A | * | 12/1975 | Meyer | 414/111 |
| 3,949,886 A | * | 4/1976 | Harber et al. | 414/789.7 |
| 3,958,823 A | | 5/1976 | Erlenbusch et al. | |
| 4,019,620 A | * | 4/1977 | Frenkel et al. | 198/399 |
| 4,051,964 A | * | 10/1977 | Meijer | 414/800 |
| 4,053,064 A | | 10/1977 | Stewart | |
| 5,829,238 A | | 11/1998 | Branson | |
| 6,851,908 B2 | | 2/2005 | Bergen et al. | |
| 2004/0223833 A1 | * | 11/2004 | Kuhns | 414/111 |

FOREIGN PATENT DOCUMENTS

GB 2086306 A * 5/1982

OTHER PUBLICATIONS

Netherex, The Packmaker Bale Accumulator 8 & 12 bale models, www.netherexe.com/accumulator.htm, Ontario, Canada.

* cited by examiner

*Primary Examiner*—Gregory W Adams
(74) *Attorney, Agent, or Firm*—Angela Holt; Lanier Ford Shaver & Payne P.C.

(57) ABSTRACT

A drag-behind square hay bale accumulator that groups ten (10) bales of hay is claimed. The grouping configuration has the advantage of providing the first two bales of hay turned at right angles to the remaining bales, to provide for improved stacking of the hay bales. The accumulator is comprised of an open framework within which channels for routing the bales are positioned. After a group of ten (10) bales is collected, the accumulator leaves the bales on the field in a grouping that can be mechanically picked up and stacked.

3 Claims, 8 Drawing Sheets

← Direction of motion of hay bale accumulator

← Direction of motion of hay bale accumulator

HAY BALE ACCUMULATOR

REFERENCE TO RELATED APPLICATIONS

This application claims priority to Provisional Patent Application U.S. Ser. No. 60/783,893, entitled "Hay Bale Accumulator" and filed on Mar. 20, 2006, which is fully incorporated herein by reference.

BACKGROUND

1. Field

The present invention relates generally to a hay bale accumulator. More particularly, the present invention relates to an improved square hay bale accumulator that receives bales from a hay baler and groups them in a ten-bale group for easy pick-up and stacking.

2. Background of the Invention and Prior Art

Hay bale accumulators are used for collecting square bales of hay into close groups of a fixed number of bales so that they may be easily loaded and moved. Before the invention and use of hay bale accumulators, bales of hay ejected from the hay baler in a field would have to be picked up one at a time and manually loaded onto a truck or wagon. Because individual bales are heavy and unwieldy, and because the hay baler drops them off twenty to thirty feet apart from one another, collecting and loading bales of hay was a difficult and time-consuming task.

Hay bale accumulators make the job of collecting and loading bales of hay far easier. A typical hay bale accumulator is pulled behind the baler and collects the bales as they are ejected from the hay baler and then arranges them while they are dragging along the ground in an accumulator frame into a close rectangular grouping of bales, in a single layer with as many as 8-12 bales total. The accumulator then releases the neat grouping of bales onto the field, where the grouping can be picked up as a unit by mechanical lifting devices or special bale forks and loaded onto a wagon or trailer for removal from the field. With the aid of an accumulator, no manual lifting or stacking of bales is required.

Hay bale accumulators of the type discussed and disclosed herein are those in which the hay bales drag on the ground behind a hay baler while constrained within the open framework of the accumulator, as opposed to the type in which the hay bales are accumulated on some type of platform or trailer.

An example of a prior art hay bale accumulator is disclosed and claimed in U.S. Pat. No. 3,779,402, which discloses an accumulator capable of grouping eight (8) bales of hay, in two (2) rows of four (4) bales each. Similarly, U.S. Pat. No. 4,053,064 discloses an accumulator for grouping a number of bales. In each of these prior art inventions, however, the bales of hay are all arranged in a grouping in which each bale is lined up in the same direction. For example, the hay bale accumulator disclosed in U.S. Pat. No. 4,053,064 is capable of arranging bales as shown in FIG. 1 (in which eight bales are labeled "A"-"H" in the order in which they are collected and aligned by the accumulator). It would be desirable for the hay bales to be grouped so that some of the bales are turned at an angle to the other bales, because this configuration of bales stacks better than if the bales are all turned in the same direction. Specifically, if the bales on one end of the grouping are turned at right angles to the bales on the other end, as is shown in FIG. 2 (in which ten bales are labeled "A" through "I" in the order that the bales are collected by the accumulator) then when multiple layers of bales are stacked, the resultant stack is more stable.

Further, it would be desirable to have a hay bale accumulator that provides this improved configuration of bales in a ten-bale grouping.

SUMMARY OF THE INVENTION

Therefore, it is an object of the present invention to provide a square hay bale accumulator that groups ten (10) bales of hay in a grouping in which the bales on one end are turned at right angles to the remaining bales. The present invention achieves this objective with a drag-behind accumulator that turns the first two (2) bales sideways and then lines the last eight (8) bales in four columns of two bales each adjacent to the first bales, as is shown in FIG. 2. After the ten (10) bales are grouped, an automatic gate trips, releasing the grouping onto the field, where it can be picked up as a unit by a mechanical lifting device for stacking.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

BRIEF DESCRIPTION OF THE DRAWINGS

The present invention is described with reference to the accompanying drawings. In the drawings, like reference numbers indicate identical or functionally similar elements.

DETAILED DESCRIPTION OF THE ILLUSTRATED EMBODIMENT

Figure 1:
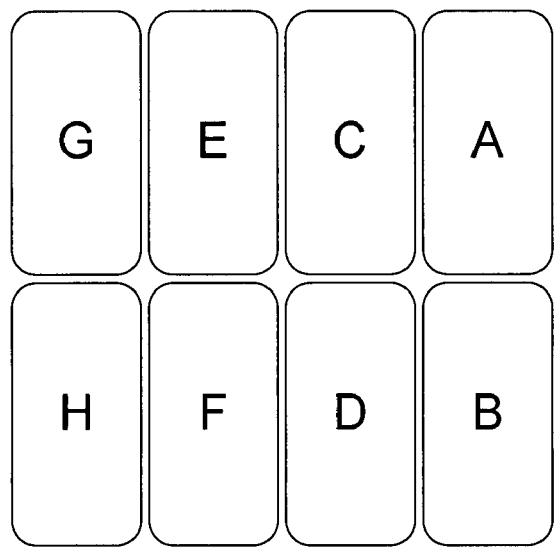
FIG. 1 shows the hay bale grouping configuration provided by some prior art hay bale accumulators.
Figure 2:
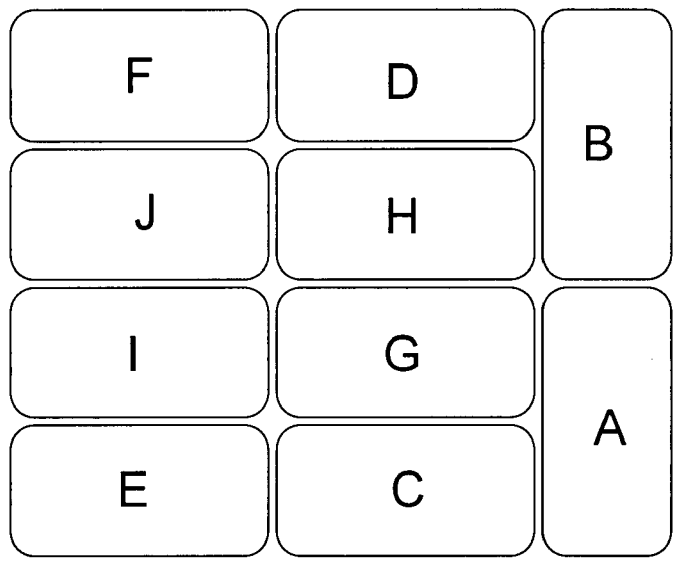
FIG. 2 shows the improved grouping configuration of hay bales provided by the present invention.

The present invention and its advantages are best understood by referring to the drawings. The elements of the drawings are not necessarily to scale, emphasis instead being placed upon clearly illustrating the principles of the invention. Throughout the drawings, like numerals are used for like and corresponding parts of the various drawings.

As described above and shown in the associated drawings and exhibits, the present invention comprises a hay bale accumulator. While particular embodiments of the invention have been described, it will be understood, however, that the invention is not limited thereto, since modifications may be made by those skilled in the art, particularly in light of the foregoing teachings.

Figure 3:
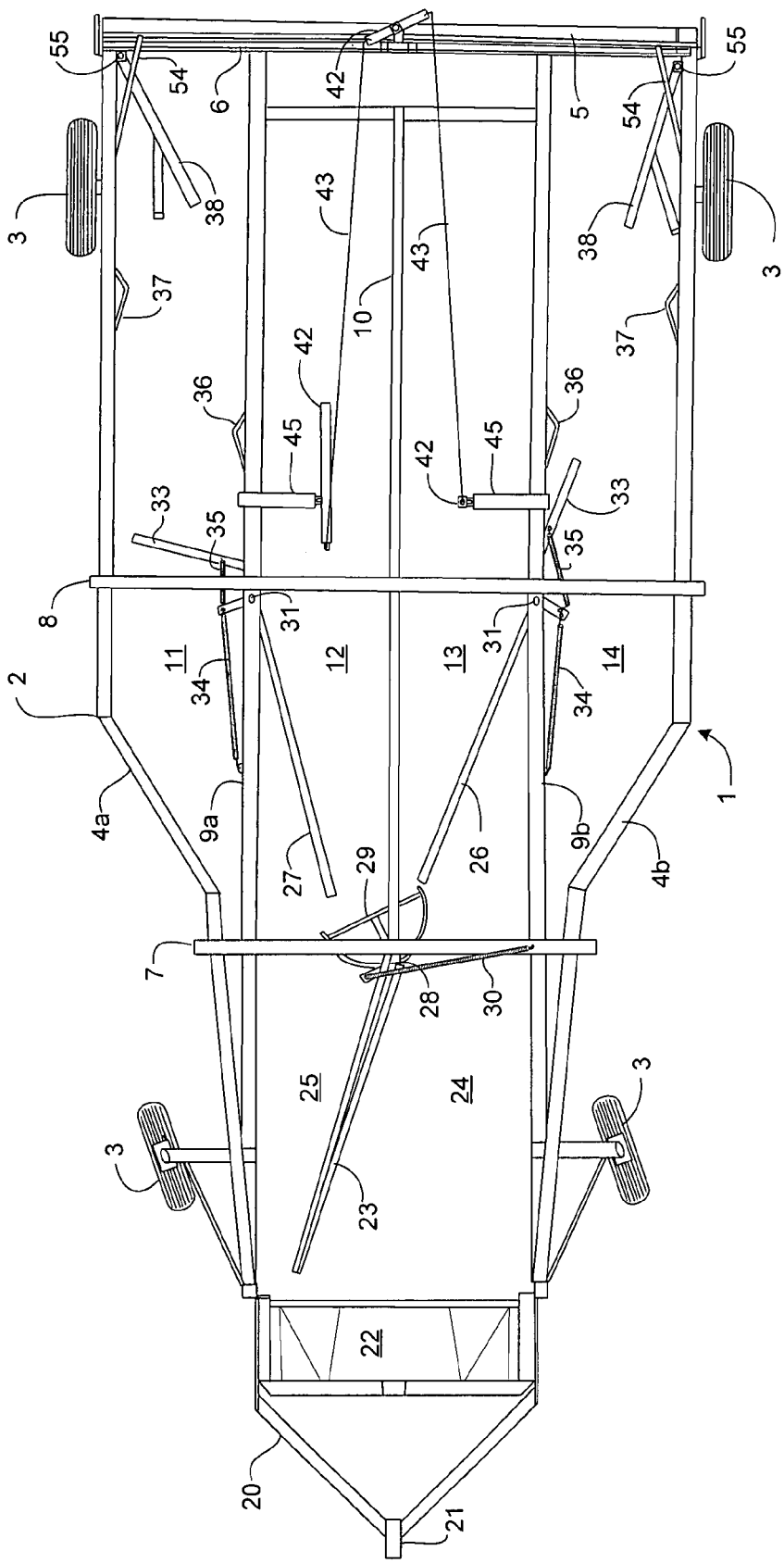
FIG. 3 is a top view of one embodiment of the invention.

FIG. 3 is a top view of one embodiment of the present invention. The hay bale accumulator 1 consists of an open accumulator frame 2 on wheels 3 and is designed to be connected to and towed behind a hay baler (not illustrated). The accumulator frame 2 consists generally of right and left side frames 4a and 4b, respectively, a rear frame 5 supporting a release gate 6, right and left longitudinal frames 9a and 9b, respectively, and forward bridge frame 7, and rearward bridge frame 8, which bridge frames 7 and 8 serve to connect together and support the side and longitudinal frames and other components as described herein.

Figure 4:
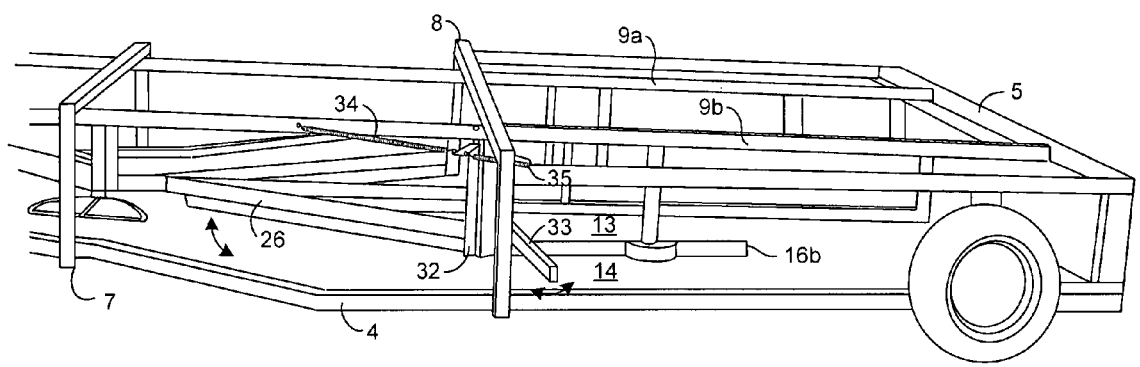
FIG. 4 is a partial perspective view of one embodiment of the invention.
Figure 10:
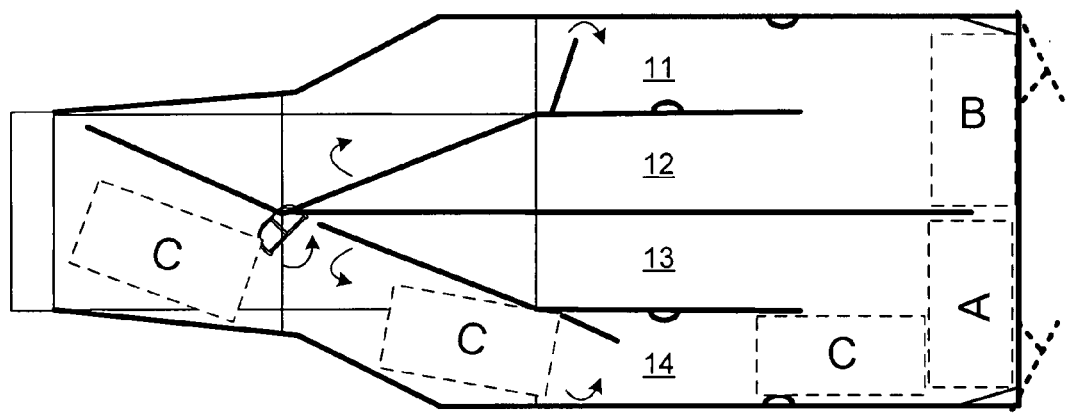

A central division 10 extends from the forward bridge frame 7 toward the rear of the accumulator frame 2. The side frames 4a and 4b, longitudinal frames 9a and 9b, and central division 10 form four (4) "channels" (right outside channel 11, right inside channel 12, left inside channel 13, and left outside channel 14) for directing and constraining bales. As can be seen in FIG. 4, underneath the right and left longitudinal frames 9a and 9b are lower longitudinal frame portions 16a (not illustrated) and 16(b), and these lower portions 16a and 16b do not extend to the rear frame 5, but rather protrude only partially between the rearward bridge frame 8 and the rear frame 5. Therefore, channels 11 and 12 are in open communication with each other at the rear region of the accumulator frame 2 and channels 13 and 14 are in open communication with each other at the rear region of the accumulator frame. This open communication between the channels on each side of the central division 10 is important, because, as is discussed in more detail below, the first bale to enter each side of the accumulator is turned sideways, so that after a bale is turned, it is positioned in both of the channels 11 and 12 or 13 and 14 (see, e.g., FIG. 10).

Figure 5:
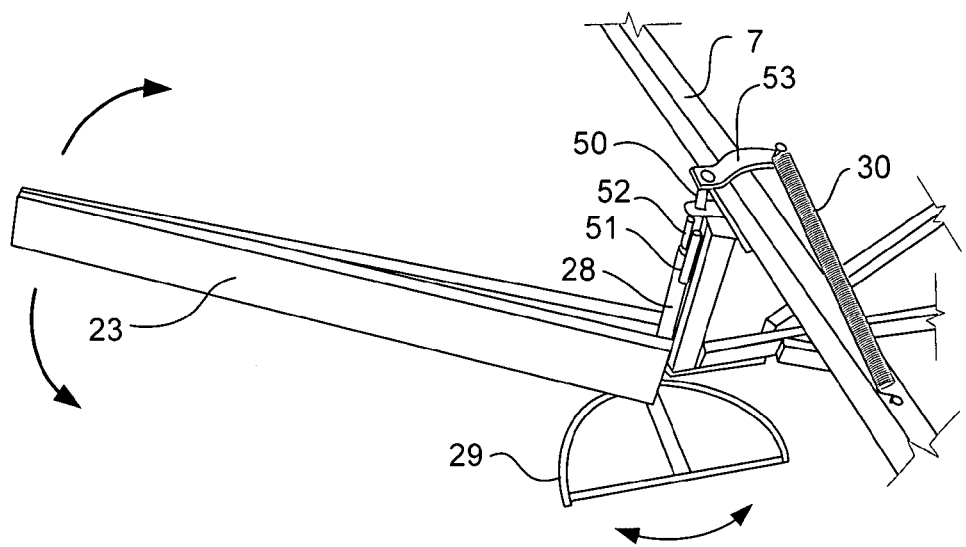
FIG. 5 is an enlarged partial view of the forward bale deflector gate and associated mechanisms.

Referring to FIG. 3, the front end 20 of the accumulator has a connection means 21 to allow connection to the rear of the hay baler (not illustrated). Chute 22 provides a ramped pathway from the baler into the framework of the accumulator. Forward bale deflector gate 23 is provided to deflect the bales presented from the chute 22 alternatively into the left side 24 and the right side 25 of the accumulator. The deflector gate 23 is rigidly connected to vertical pivoting sleeve 28 and extends forwardly from the forward bridge frame 7. As is shown in FIG. 5, vertical pivoting sleeve 28 surrounds and rotates around shaft 50, which is itself pivotally connected to the forward bridge frame 7. A projecting forward gate resetting device 29 is rigidly connected to the shaft 50, so that movement of the gate resetting device 29 causes shaft 50 to rotate. The shaft 50 is also connected via rigid strap 53 to forward spring 30. The other end of forward spring 30 is connected to forward bridge frame 7. Two sleeve lugs 51 (one of which is illustrated in FIG. 5) are rigidly connected to vertical pivoting sleeve 28 in such a manner as to protrude from the upper end of the sleeve. Shaft lug 52 protrudes from and is rigidly connected to shaft 50 and is situated between the two sleeve lugs 51, so that rotation of the shaft 50 will cause the shaft lug 52 to contact one of the sleeve lugs 51, which in turn will rotate the vertical pivoting sleeve 28 and forward bale deflector gate 23. In operation, movement of the forward gate resetting device 29 by about 180 degrees will cause the forward bale deflector gate 23 to move about 30-40 degrees, the distance needed to move gate 23 from one to the other of its "resting" positions.

Referring to FIG. 3, left bale deflector gate 26 and right bale deflector gate 27 are provided to guide bales into one of the left two channels (13 and 14) or into one of the right two channels (11 and 12), respectively.

Figure 6:
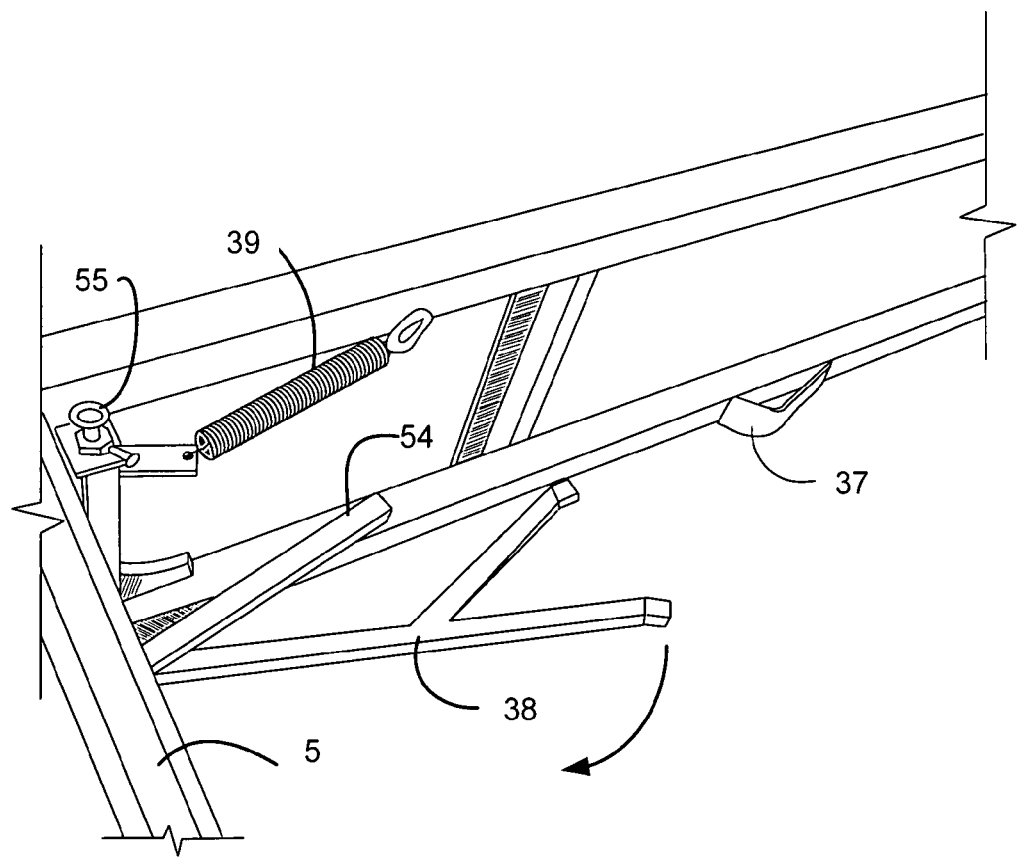
FIG. 6 is an enlarged partial view of the inside left corner of the accumulator showing the Y-shaped bale turning bar.

The left and right bale deflector gates (26 and 27) are mirror images of each other, and each is attached to a pivoting vertical support 32 pivotally connected between the right or left longitudinal frame 9a or 9b and lower longitudinal frame portion 16, as illustrated in FIG. 4. Pivoting bars 33 connected to the bale deflector gates 26 and 27 through springs 34 and 35 are provided to cause the left or right bale deflector gates to move to its second position after the outside channels 11 and 14 are filled with bales. Referring to FIG. 3, bumpers 36 and 37 on the inside of channels 11 and 14 are provided to cause the first bale in each channel to start turning from a longwise position to a sideways position. Referring to FIGS. 3 and 6, Y-shaped bale turning bars 38 are pivotally connected via pivot 55 to the corner of the rear frame 5 through springs 39 to cause the first bales in each of channels 11 and 14 to completely turn into a sideways position. Rigid guide bars 54 are connected between the rear frame 5 and the side frames 4a and 4b at the rear corners to for the purpose of pushing the bales closer together and to guide the bales around the working parts of the Y-shaped bale turning bars 38. A close-up illustration of a Y-shaped bale turning bar 38 and rigid guide bar 54 is provided in FIG. 6.

Figure 7:
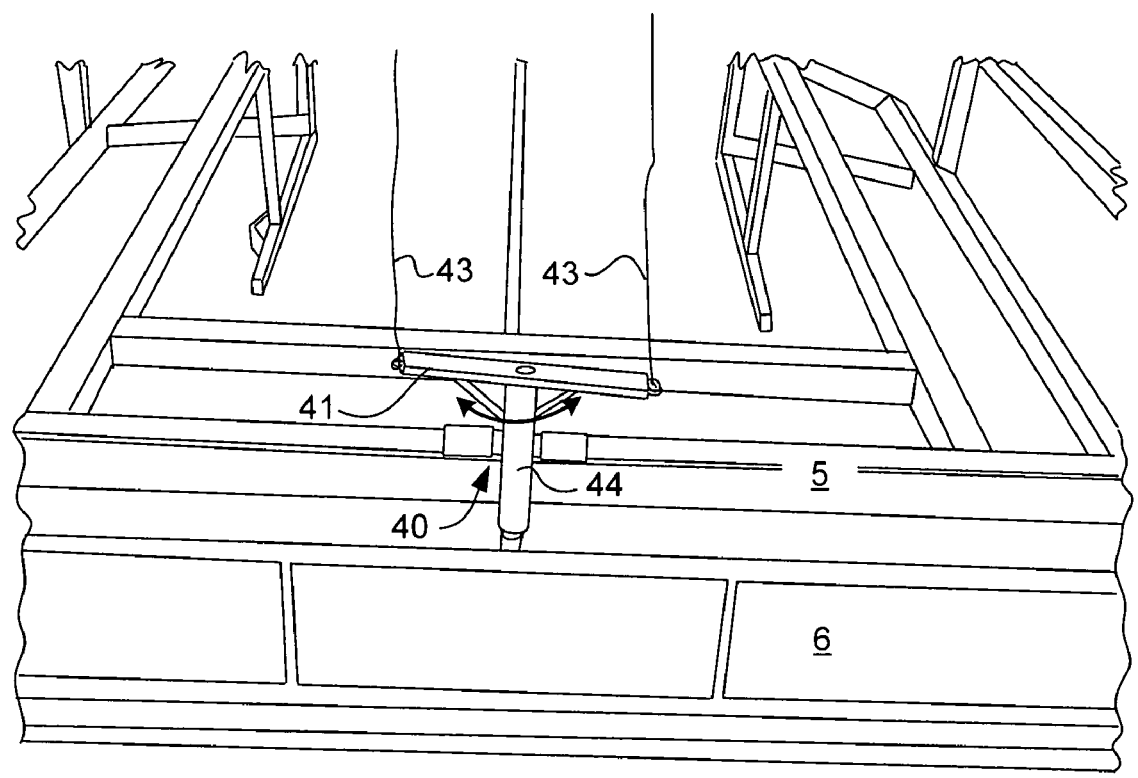
FIG. 7 is an enlarged partial view of the rear of the accumulator.

Referring to FIG. 7, release gate 6, which serves to hold the bales in the accumulator until it is full, is pivotally connected to the rear frame 5. Rear gate releasing means 40 is provided to allow the release gate 6 to pivot open when the accumulator has been filled to capacity. The rear gate releasing means 40 comprises a T-shaped release latch 41 configured so that the latch bottom 44 is pivotally connected to the rear frame 5. The T-shaped release latch 41 is designed to pivot horizontally when tension is applied to one or the other of its upper edges. However, when sufficient tension is applied from the forward direction to both of its upper edges, the release latch will pivot vertically in the forward direction, releasing the gate 6 to pivot open under the force of the hay bales pressed against it, and allowing the bales to pass underneath release gate 6.

Each of the upper outside edges of the T-shaped release latch 41 is connected via wire 43 to the upper portion of a vertical rotating trip arm 42, as illustrated in FIG. 3. In lieu of a wire, a chain, strap or other connection medium can be used to connect the T-shaped release latch 41 to the vertical rotating trip arm 42. Each vertical rotating trip arm 42 is pivotally connected to a support bar 45 connected to the longitudinal frames 9a and 9b and suspended over channels 12 and 13, as shown in FIG. 3. Other configurations for the rear gate releasing means 40 are possible without departing from the scope of the present invention.

In an example operation of the hay bale accumulator according to the present invention, the first bale is directed down the chute 22 and hits the ground and almost immediately comes into engagement with the forward bale deflector gate 23, which in its "resting" state is adjacent frame 4a on the right side of the accumulator, as can be seen in FIG. 3. The forward bale deflector gate 23 deflects the bale into the left side 24 of the accumulator. As the bale moves past the forward bale deflector gate 23, the bale contacts the projecting forward gate resetting device 29 and exerts a force thereupon tending to move the forward bale deflector gate 23 towards its second position (i.e., contacting the opposite side of the frame). More specifically, referring to FIG. 5, contact from a hay bale to the projecting forward gate resetting device 29 causes the shaft 50 to rotate, which causes shaft lug 52 to contact one or the other of the two sleeve lugs 51, which in turn causes the sleeve to rotate and move the forward bale deflector gate 23 to the opposite side of the frame. Forward spring 30 provides a biasing force to hold the forward bale deflector gate 23 in its current position until another bale contacts the projecting forward gate resetting device 29 and moves the forward bale deflector gate 23 to its alternate position.

Referring to FIG. 3, the first bale then contacts left bale deflector gate 26, which in its "resting" state rests adjacent to the central division 10. Left bale deflector gate 26 deflects the bale and causes it to move into left outside channel 14. As the bale continues down left outside channel 14, it contacts pivoting bar 33, which rotates out of the way of the bale, causing the left bale deflector gate 26 to move temporarily to its second position against the outside frame 4b. However, after the first bale clears pivoting bar 33, the pivoting bar 33 returns to its original position and causes the left bale deflector gate 26 to return to its original position.

Figure 8:
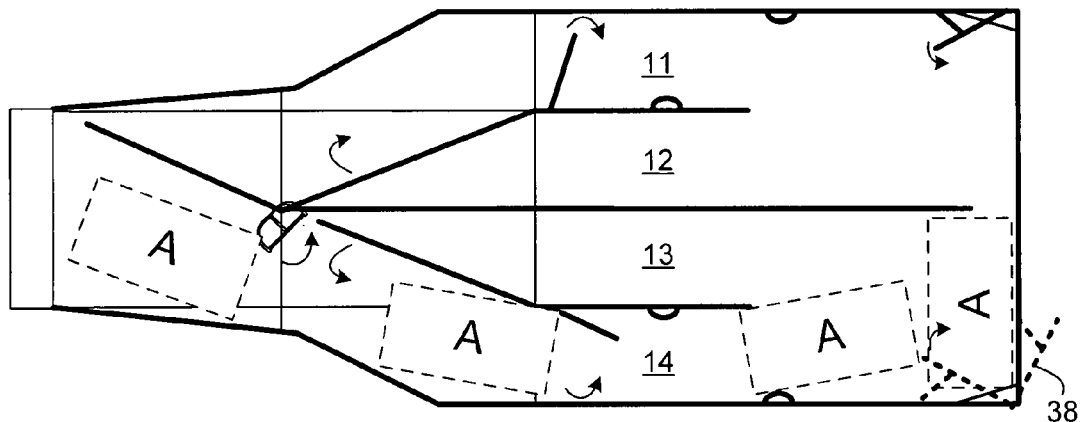
FIGS. 8-15 are functional representations of the framework of the present invention as bales of hay are being accumulated.

Bumpers 36 and 37 start the first bale turning from a longwise position to a sideways position. The end of the bale then contacts the Y-shaped bale-turning bar 38, and the bar rotates toward the release gate 6. The rotation of the Y-shaped bale-turning bar 38 causes the bale to complete its rotation into a fully sideways position, and it comes to a "rest" when its side contacts the release gate 6. (Note that the bale is still moving at this point, dragged along the ground by the force of the gate 6 against the bale, but is at rest relative to the accumulator frame.) Pushed by the bale, the Y-shaped bale-turning bar 38 rotates out of the way, underneath the release gate 6, and remains in that position until all of the bales have been grouped and are released. The movement of the first bale, as described herein, is represented functionally in FIG. 8, where the first bale is signified by the letter "A."

Figure 9:
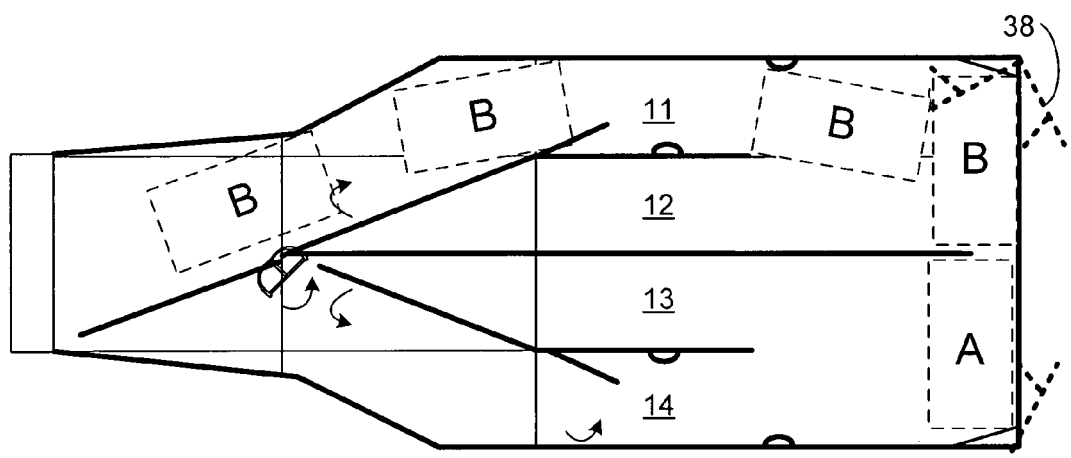

The second bale to enter the accumulator would be directed toward the right side 25 of the accumulator, because the forward bale deflector gate 23 would be positioned against the left side of the frame. Referring to FIG. 3, as the second bale moves down the channel, it contacts the projecting forward gate resetting device 29, which causes the forward bale deflector gate 23 to return to its original position against the right side of the frame. The second bale is deflected by right bale deflector gate 27 into channel 11, and moves through channel 11 in a fashion mirror-imaged to the first bale's movement through channel 14. The second bale comes to a rest against release gate 6 in a sideways position next to the first bale. The movement of the second bale is illustrated functionally in FIG. 9, where the second bale is signified by the letter "B."

The third bale to enter the accumulator would be directed toward the left side 24 of the accumulator, and would proceed down channel 14 in the same manner as the first bale. However, the third bale will not turn sideways, but will remain in a lengthwise position down the channel. The third bale remains lengthwise because (1) it does not have the clearance between the longitudinal frame lower portion 16b and the side frame 4b to turn (see FIG. 4) and (2) because it does not contact the Y-shaped bale-turning bar 38 (FIG. 3), which has been rotated out of the way by the first bale. Therefore, the third bale comes to a rest with its end against the side of the first bale. The movement of the third bale is illustrated functionally in FIG. 10, in which the third bale is signified by the letter "C."

Figure 11:
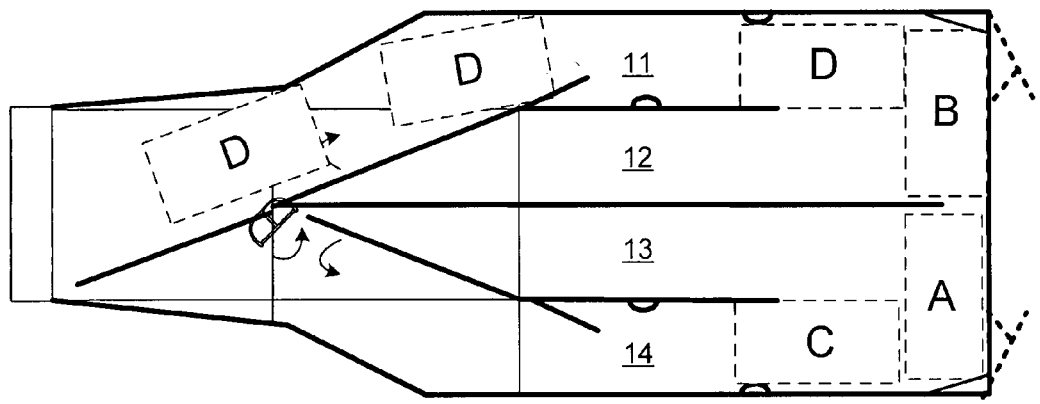

The fourth bale moves in a manner mirror-imaged to that of the third bale, and comes to a rest with its end against the second bale, as is functionally illustrated in FIG. 11, in which the fourth bale is signified by the letter "D."

Figure 12:
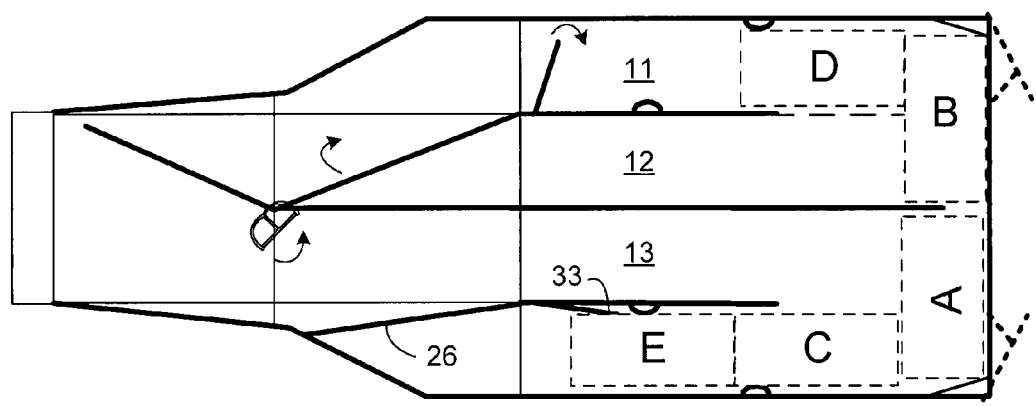

The fifth bale travels the same path as the third bale, and ends up resting end-to-end with the third bale, as is illustrated in FIG. 12, in which the fifth bale is signified by the letter "E."

However, after the fifth bale is in place, the left pivoting bar 33 is constrained by the bale from returning back to its initial position, and thus the left bale deflector gate 26 is now resting against frame 4b (FIG. 3).

Figure 13:
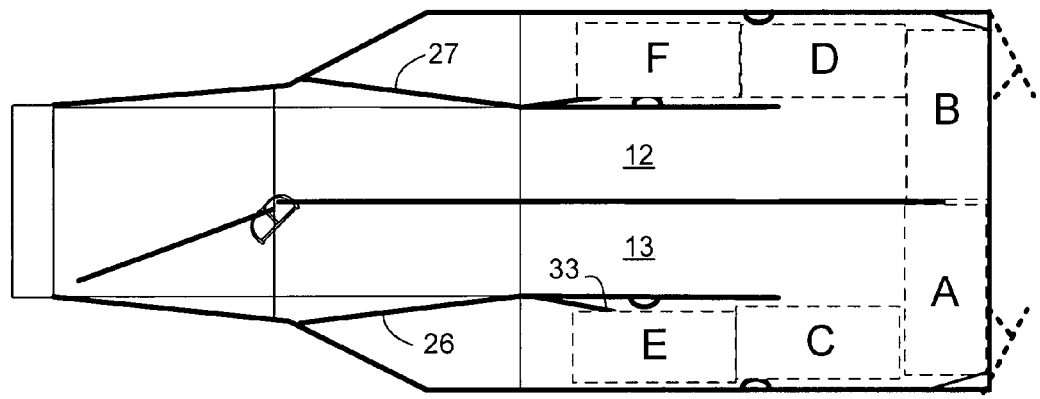

The sixth bale moves in a manner mirror-imaged to that of the fifth bale, and comes to a rest with its end against the end of the fourth bale, as is illustrated in FIG. 13, in which the sixth bale is signified by the letter "F." The sixth bale constrains right pivoting bar 33 in its second position on the right side, and thus the right bale deflector gate 27 is now resting against frame 4a (FIG. 3).

Figure 14:
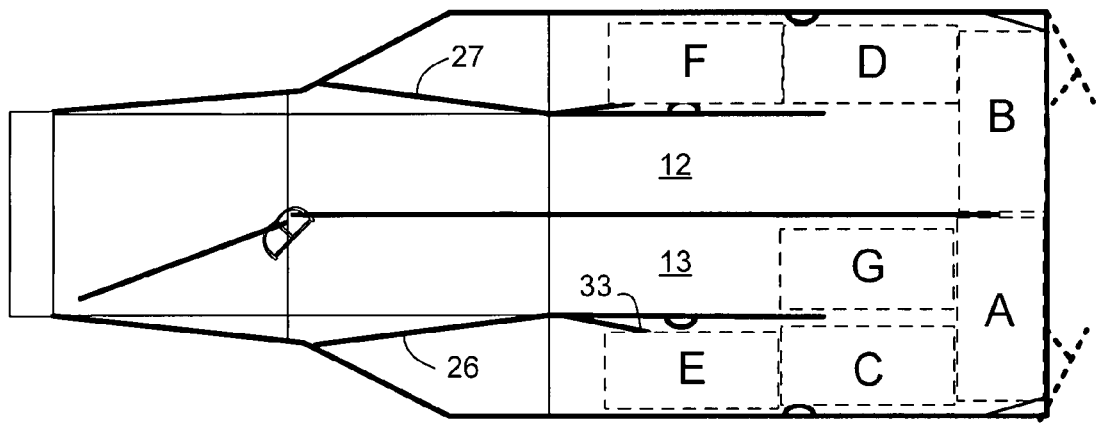

The seventh bale moves into the left side of the accumulator 24, and is deflected by the left bale deflector gate 26 into channel 13. The seventh bale continues down channel 13 and comes to a rest with its end against the side of the first bale, as is illustrated in FIG. 14, in which the seventh bale is signified by the letter "G." When the seventh bale passes underneath vertical rotating trip arm 42 (FIG. 3) in channel 13, the bale causes the arm to rotate into a horizontal position. This movement of the vertical rotating trip arm 42 does not cause the T-shaped release latch 41 to trip, opening the release gate 6, however, as both ends of the release latch must be pulled in order for the latch to open the release gate 6. The only way for both ends of the release latch to open is for bales of hay to remain underneath both vertical rotating trip arms 42, thus causing sufficient tension on both edges of the T-shaped release latch 41.

The eighth bale (designated "H" in FIG. 15) moves in a manner mirror-imaged to that of the seventh bale, and comes to a rest with its end against the side of the second bale. When the eighth bale passes underneath vertical rotating trip arm 42 in channel 12, the bale causes the arm to rotate into a horizontal position. This movement of the vertical rotating trip arm 42 does not cause the T-shaped release latch 41 to trip and open the release gate 6, because there is no tension against the vertical rotating trip arm 42 in channel 13.

The ninth bale (designated as "I" in FIG. 15) follows the same path as the seventh bale, and comes to a rest end-to-end with the seventh bale. When the ninth bale is in its final position, it is wedged underneath the vertical rotating trip arm 42 (FIG. 3) so as to prevent it from returning to its original position.

Figure 15:
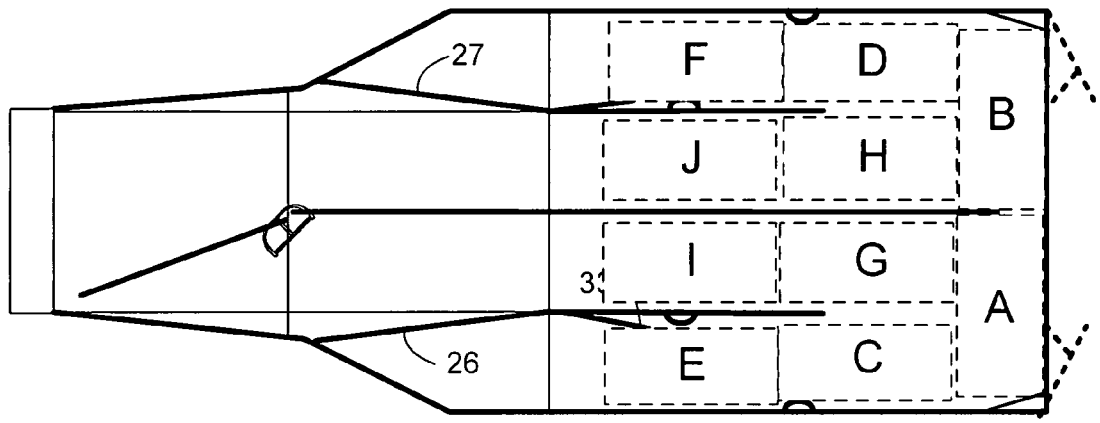

The tenth and final bale (designated at "J" in FIG. 15) follows the same path as the eighth bale, and comes to a rest end-to-end with the eighth bale, as is illustrated in FIG. 15. When the tenth bale passes under the vertical rotating trip arm 42 (FIG. 3), the arm is rotated up, causing sufficient tension to trip the T-shaped release latch 41 and release the release gate 6. The force of the bales against the release gate 6 causes the gate 6 to pivot upward, and the bales will be released from the accumulator and come to a rest on the field, while the accumulator moves on.

After the bales are released, the Y-shaped bale turning bar 38 is returned to its original position by spring 39, and the release gate 6 returns to the closed position, and the cycle of accumulation may be repeated.

This invention may be provided in other specific forms and embodiments without departing from the essential characteristics as described herein. The embodiment described is to be considered in all aspects as illustrative only and not restrictive in any manner.

As described above and shown in the associated drawings and exhibits, the present invention comprises a hay bale accumulator. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. A bale accumulator movable over the ground for receiving and aligning multiple bales of hay, comprising:
    a frame for containing the bales;
    an end gate attached to the rear end of the accumulator for restraining the bales in moveable contact with the ground;
    at least a pair of Y-shaped pivoting bars for rotating a first and a second bale received by the accumulator substantially ninety-degrees and positioning a rearward long side of the first and second bales directly against the end gate with the first and second bales aligned end to end;
    bumpers for directing four additional bales of hay substantially perpendicular to the first and second bales of hay with a short side of each of the four additional bales of hay collected aligned against frontward long sides of either the first or second bale of hay;
    wherein the at least a pair of Y-shaped pivoting bars are rotatably connected to opposed rear corners of the frame, wherein each bar constantly contacting with the first or second bales of hay rotates the bales into an orientation in which the bales' rearward long sides contact the end gate.

2. A bale accumulator comprising:
    a bale confining frame;
    a rear frame and release gate across the rear of the bale confining frame;
    a central division in combination with the bale confining frame, defining two adjacent bale holding compartments;
    primary diverters projecting from the forward end of the central division to divert bales coming into engagement therewith alternatively into one compartment and then the other compartment until both compartments are full;
    at least a pair of Y-shaped pivoting bars for rotating the first two bales received by the accumulator substantially ninety degrees and positioning a long side of each of the first two bales directly against the end gate;
    longitudinal divisions between the central division and outside edges of the bale confining frame for partially subdividing the two adjacent bale holding compartments into four adjacent bale holding compartments;
    secondary diverters to divert bales received by the accumulator after the first two bales into four columns of bales in the four sub-compartments, wherein each bale in the four columns of bales is disposed generally perpendicularly to the first two bales;
    an opener to open said release gate, releasing together in a group the bales from the filled compartments;
    wherein the at least a pair of Y-shaped pivoting bars are rotatably connected to opposed rear corners of the frame, wherein each bar constantly contacting with a bale of hay rotates the bale into an orientation in which the bale's long side contacts the end gate.

3. A hay bale accumulator comprising:
    a Y-shaped bar rotatably affixed to a rearward right corner of a frame such that when the Y-shaped bar comes in contact with a first bale of hay, the first bale of hay rotates from an initial orientation substantially parallel to the direction of motion of the accumulator until the first bale of hay is substantially perpendicular to the direction of motion of the accumulator with its long side in contact with an end gate of the accumulator;
    a Y-shaped bar rotatably affixed to a rearward left corner of the frame such that when the Y-shaped bar comes in contact with a second bale of hay, the second bale of hay rotates from an initial orientation substantially parallel to the direction of motion of the accumulator until the second bale of hay is substantially perpendicular to the direction of motion of the accumulator with its long side in contact with the end gate of the accumulator;
    a plurality of bale deflecting gates for directing eight additional bales of hay into four rows of two bales in which the two bales in each row are aligned end to end with respect to each other and are perpendicular to the first and second bales of hay and in which a short side of one of the two bales in each row directly contacts a long side of either the first or the second bale of hay.

* * * * *